Aug. 10, 1954  R. J. BOTTONI ET AL  2,686,064
CABLE CONNECTOR FOR JUNCTION BOXES OR THE LIKE
Filed Nov. 5, 1949  3 Sheets-Sheet 1
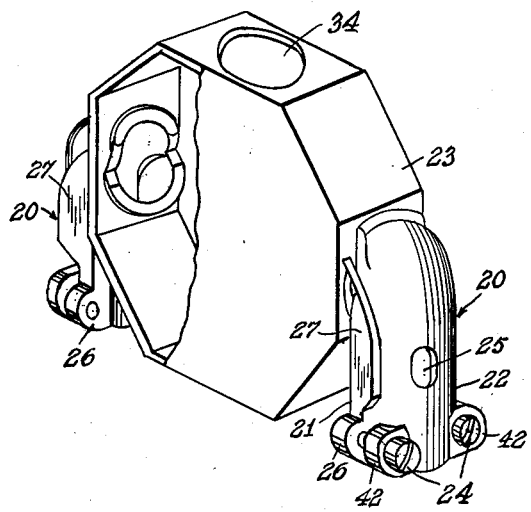
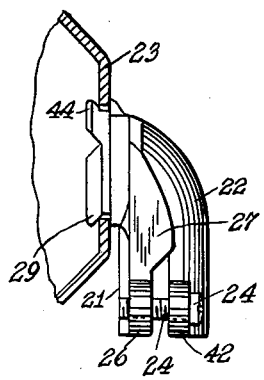
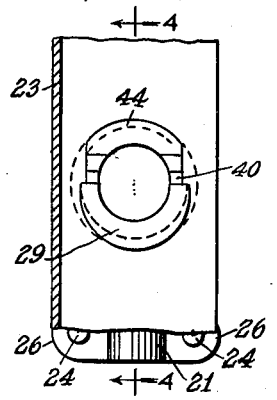
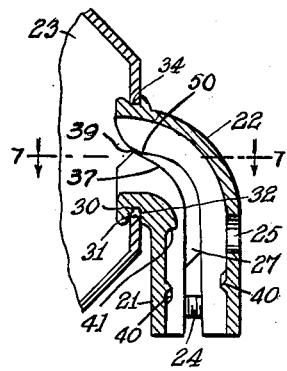
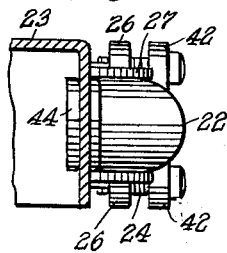
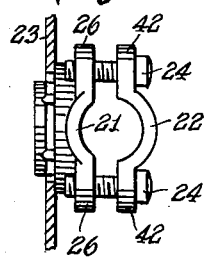
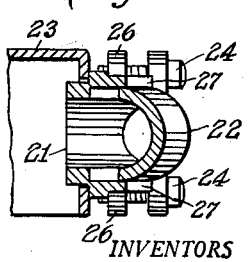
INVENTORS
ROBERT J. BOTTONI AND
BY  VICTOR G. HAROLDSON
Edward T. Connors
ATTORNEY.

Aug. 10, 1954 R. J. BOTTONI ET AL 2,686,064
CABLE CONNECTOR FOR JUNCTION BOXES OR THE LIKE
Filed Nov. 5, 1949 3 Sheets-Sheet 2
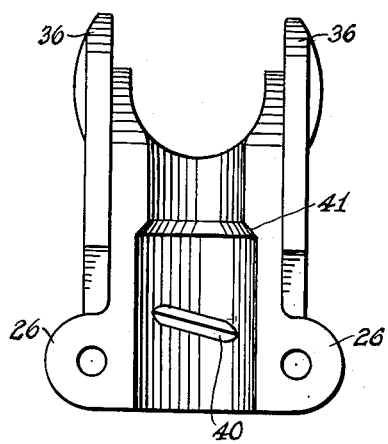
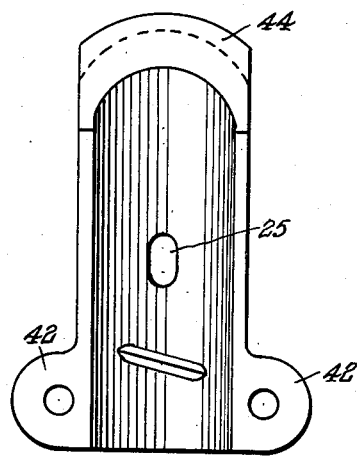
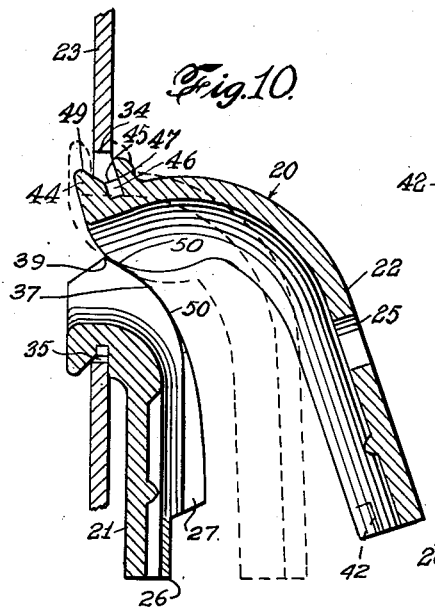
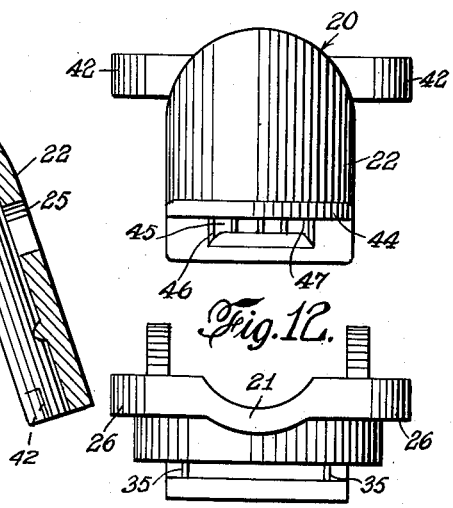
INVENTORS
ROBERT J. BOTTONI AND
BY VICTOR G. HAROLDSON
Edward T. Connors
ATTORNEY.

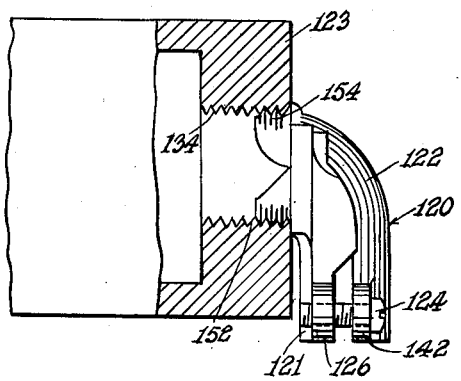
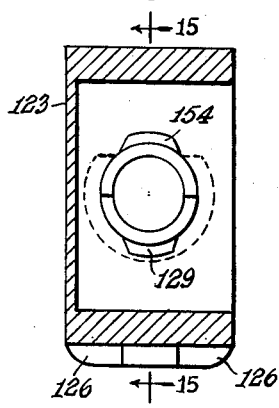
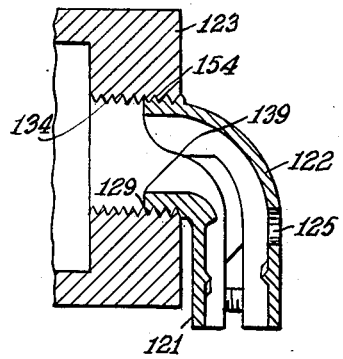
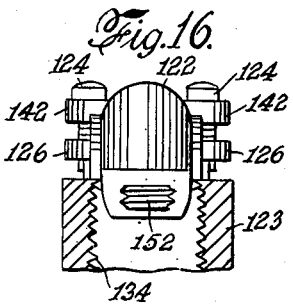
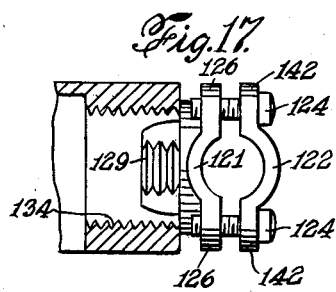

Patented Aug. 10, 1954

2,686,064

UNITED STATES PATENT OFFICE 2,686,064

CABLE CONNECTOR FOR JUNCTION BOXES OR THE LIKE

Robert J. Bottoni, East Orange, N. J., and Victor G. Haroldson, Bronx, N. Y., assignors to Unimatic Corporation, Nutley, N. J.

Application November 5, 1949, Serial No. 125,748

1 Claim. (Cl. 285—6.5)

This invention relates to electrical cable connectors and particularly to a connector or fitting for holding a cable in engagement with a junction box or casing for an electrical device. The connector is an improvement over the device disclosed in co-pending patent application of Robert J. Bottoni, Serial No. 610,127 filed August 10, 1945, now Patent No. 2,491,157. The connector may be inserted through an opening in a junction box and adjusted from the exterior thereof to grip the cable and to hold itself in position.

It is important that a cable connector be easily installed with a minimum expense and that the device be manufactured at a low cost to be salable because of its competitive nature. Furthermore, the construction must be strong to minimize the possibility of the cable being pulled from the box to cause a short circuit or interruption of service.

Early cable connectors were constructed which were adapted to be held in the junction box opening by engagement of a nut with a threaded portion of the connector. It was found that in some cases it was difficult and time consuming to attach the nut to the connector because of the close quarters resulting from other wires on the junction box. The nut was particularly difficult to attach when the junction box was in an inaccessible location. Later cable connectors were provided in which the connector was attached to the junction box from the exterior thereof by the use of expanding means for one end of the connector to hold it in the opening of the junction box. Such connectors have been generally satisfactory in that they may be installed with a minimum of labor and with the ordinary skill of the trade. A disadvantage of many of these connectors has been the excessive cost of manufacture, or if the cost has been reduced to a competitive figure, the construction has been such as to fail to produce the requisite strength and rigidity.

The present invention seems to overcome the foregoing difficulties and disadvantages by providing a connector which is simple and economical in manufacture, readily installed in position, and durable in use.

In accordance with the invention this is accomplished by providing a connector having companion sections held in engagement with the junction box or casing of the electrical device with which it is used by extending the ends of the section into the opening of the box and expanding the ends to engage with the wall of the opening. A rocking movement of the parts is had to produce the expanding movement and simultaneously to grip the wall of the cable to hold it firmly in position, the parts fulcruming in a plane approximately at the outer side of the wall of the junction box.

The construction in accordance with the invention is advantageous in that it may be made by die-casting as well as by other conventional methods of manufacture. Further, by positioning the fulcrum point adjacent the outer wall of the junction box a long movement arm is had for the cable engaging end of the connector providing for considerable variation in the size of the cable without appreciably affecting the size of the opening engaging end of the connector.

Other objects and advantages of the invention will be apparent from the following description and from the accompanying drawings which show, by way of example, embodiments of the invention.

In the drawings:

Figure 1 is a perspective view of a junction box with a pair of connectors constructed in accordance with the invention installed in openings therein.

Figure 2 is a side view of the connector with the side wall of the junction box shown in section.

Figure 3 is a view of the inner end of the connector looking outwardly from the junction box, the wall of the box being shown in section.

Figure 4 is a vertical sectional view of the connector taken along the line 4—4 of Figure 3.

Figure 5 is a plan view of the connector in position in the junction box, the wall of the box being shown in section.

Figure 6 is a bottom view of the connector corresponding to Figure 5.

Figure 7 is a horizontal sectional view of the connector taken along the line 7—7 of Figure 4.

Figure 8 is an enlarged inside view of the bottom section of the connector.

Figure 9 is an enlarged inside view of the top section of the connector.

Figure 10 is an enlarged vertical sectional view of the connector corresponding to Figure 4 but with the upper section of the connector swung away from the lower section to illustrate its installation in the junction box, dotted lines are used to show the final position of the connector.

Figure 11 is an enlarged end view of the top section of the connector showing its shallow take-up webs.

Figure 12 is an enlarged end view of the bottom section of the connector showing its shallow take-up webs.

Figure 13 is a side view of another embodiment of the invention shown in position in a switch housing or like device having a threaded opening for the cable.

Figure 14 is a view of the inner end of the connector shown in Figure 13 looking outwardly from the junction box.

Figure 15 is a vertical sectional view of the connector shown in Figure 13 taken along the line 15—15 of Figure 14.

Figure 16 is a top view of the connector shown in Figure 13 with the wall of the junction box broken away.

Figure 17 is a bottom view of the connector shown in Figure 13 with the wall of the junction box broken away.

Referring to the drawings there is shown a connector 20 in accordance with the invention comprised of a lower section 21 and upper section 22 held together by attaching means such as screws 24. The connector is intended for use in attaching an electrical cable to a junction box 23, or to a motor housing or other electrical device and may be made of any suitable material having the requisite strength. The construction is such that the connector may be made by die-casting as well as by other conventional methods of manufacture. In use the connector engages with the armor or sheath of a cable to transmit any pulling stress from the cable to a junction box without transmitting the stress to the electrical conductors inside the cable and connector. In Figure 1 a pair of connectors is shown in position each in opposite openings of the conventional junction box 23. The cable is not illustrated and it may be installed in the usual manner, the sheath of the cable being inserted between the sections of the connector and extending therein to a point in view through a sight opening 25 in the outer section 22. The sight opening 25 is used to permit a visual inspection of the cable to ascertain whether or not the sheath has been extended sufficiently far into the connector to withstand a pulling stress and further to permit inspection as to the presence of an insulating bushing used at the end of the armor in an armored cable. For simplicity of illustration, only the elbow type connector is shown inasmuch as it is obvious that a straight connection connector may be made by one skilled in the art based on the disclosure given herein.

The inner section 21 has a generally arcuate cross sectional shape throughout the straight portion of its body section and it has outwardly extended lug extensions 26 with threaded openings to receive the screws 24. This section is preferably formed with guide members 27 extending outwardly from the sides thereof and molded integrally therewith to hold the outer section 22 in alignment therewith. It is obvious that an alternative construction might be provided in which the guiding members are attached to the outer section 22 to hold the two companion sections in alignment. At the junction box end of the inner section 21 is an arcuate extension or anchoring section 29 having a groove 30, the front wall of which is inclined as indicated at 31 in Figure 4 while its other wall 32 is made with a flat surface to engage with the outer side of the junction box 23, the inclined surface 31 being adapted to engage with the wall of a usual knockout opening 34 of the junction box.

A plurality of webs 35 (Figure 12) extend from the flat wall 32 to the inclined wall 31 of the groove 30 for the double purpose of strengthening the anchoring section 29 and to be deformed to provide a tight engagement with the wall of the opening of the junction box. The side guiding surfaces 27 are extended somewhat beyond the end of the section 21 as indicated at 36 (Figure 8) to provide additional bearing surfaces against the outer wall of the junction box. In order to provide a bearing surface for the outer section 22 outer edges 37 of the bottom section are curved and terminate at fulcrum points 39 formed with the intersection of the curved surfaces and the edges of cutaway portions 40 of the anchoring section 29. The fulcrum points 39 are positioned approximately at the plane of the flat surface 32, that is, approximately in the plane of the outer wall of the junction box 23. On the inner surface of the body portion of the inner section is a projection 40 adapted to engage between the convolutions of an armored cable or to engage with the sheath of a lead or other composition cable. A shoulder 41 is formed in the inner section 21 to facilitate the positioning of the electric cable into the assembled connector a proper distance, the sheath or armor being adapted to be positioned to abut the shoulder 41 in a correct positioning of the cable.

The upper section 22 likewise is made with a generally arcuate cross sectional shape to conform with the shape of the lower section and provide a passage therewith in the assembled connector for the electrical cable wires. The upper section 22 has a generally straight body section terminating at its cable engaging end in a pair of apertured lugs 42 positioned opposite the lugs 26 of the inner section in the assembled connector to receive the screws 24. An arcuate extension or anchoring section 44 is made at the inner end of the outer section 22 and formed with a groove 45 to receive a portion of the wall of the opening 34 of the junction box. The anchoring section 44 is also formed with a plurality of webs 46 extending across the groove 45 to strengthen the section and to be deformed to assure a tight fit with the wall of the opening. Preferably outer wall 47 of the groove 45 is flat to conform to the outer wall of the junction box 23 while its inner wall 49 is inclined as may be seen in Figure 10 to strengthen the extension and to provide additional material to be deformed into position. In order to provide a bearing surface for the inner section 21 the edges of the outer section 22 are curved as indicated at 50 (Figure 4) to pivot on the fulcrum points 39 of the inner section 21.

In assembling the connector 20 in position in the opening 34 of the junction box 23, the inner ends of the connector are inserted in the opening with its outer or cable engaging ends spread as shown in Figure 10. The wall of the opening is then engaged in the grooves 30 and 45 and the outer ends of the connector are moved together and secured by the screws 24. It will be noted that by reason of the positioning of the fulcrum point of the two sections approximately at the outer wall of the junction box a considerable variation may be had in the movement of the cable engaging ends without appreciably moving the junction box engaging ends of the connector. Thus, the connector is suitable for use with cables of a comparatively large range in exterior diameters.

In Figures 13 through 17 another embodiment of the invention is illustrated in which corresponding parts are designated by the same reference numerals as in Figures 1 to 11 with the addition of 100. The connector 120 shown in Figure 10 in position in a junction box, switch housing, or a motor casing 123 having a threaded aperture 134 and differs from the embodiment previously described in that its junction box engaging end is formed with threaded ends rather than with the grooved ends suitable for engagement with the wall of the opening of the comparatively thin walled junction box 23. The inner section 121 of the connector 120 has its junction box end terminated in an anchoring section 129 having its outer surface formed with partial screw thread as indicated at 152. The outer section 122 likewise has its anchoring section 49 provided with a partial screw thread 154 to complement a screw threaded portion 152 of the lower section. Likewise in this embodiment, by reason of the positioning of the fulcrum point 139 adjacent the outer surface of the junction box 123, a considerable variation may be had in the position of the cable engaging ends without appreciably changing the diameter of the assembled screw thread engaging end of the connector.

While the invention has been described and illustrated with reference to specific embodiments thereof, it will be understood that other embodiments may be resorted to without departing from the invention. For example, the construction illustrated in Figures 1 through 11 might be modified by widening the grooved portions 30 and 45 to take a considerably thicker wall section of the junction box 42. Likewise, the connector might be made up in various shapes or angles or as a straight connector as desired. Furthermore, while the fastening means are shown as screw means engaged in the lug extensions on the connector, any other suitable fastening means might be utilized to draw the sections together such as, for instance, by providing the cable engaging ends of the connector with a tapered screw thread construction adapted to be engaged by a cap member having a tapered inner thread. Therefore, the forms of the invention as set out above should be considered as illustrative and not as limiting the scope of the following claim.

We claim:

An electric wire cable fitting comprising a pair of complementary separable sections curved longitudinally to make a right-angled connection, the inner ends of both sections grooved for engagement with the wall of a junction box, ears at opposite sides of the outer ends of both sections and screw fasteners passed through the ears of the sections when tightened serving to hold the sections in position about an electric cable and in the opening of a junction box, one section having a transversely extending pointed fulcrum edge on each side of the section and of the thickness thereof and positioned approximately in the plane of the outer wall of the junction box, the pointed fulcrum edges positioned at the edge of the groove remotely from the ears so as to provide a long fulcrum arm therewith, the other section having a curved surface on each edge positioned opposite the fulcrum edges, the separable sections pivotable solely by the contact of the pointed fulcrum edges of the one section against the curved sections of the opposite section, and spaced guideways on each side of one of the sections to receive the other section in alignment therebetween, the guideways formed of outwardly extending flanges extending along the plane of the outer wall of the junction box to abut thereagainst and extending from the fulcrum edges towards the ears, the outward length of the guideways such as also to provide a closed sidewall for the connector for any working spacing of the ears preventing access to the electric wires, whereby the spacing of the outer cable engaging ends of the sections may be varied with no appreciable variation in the spacing of the junction box wall engaging ends, the guideways maintaining the sections in alignment and preventing access to the electric wires.

References Cited in the file of this patent

UNITED STATES PATENTS

| Number | Name | Date |
| --- | --- | --- |
| 1,816,664 | Thomas | July 28, 1931 |
| 1,885,228 | Buchanan | Nov. 1, 1932 |
| 2,468,854 | Woodring | May 3, 1949 |
| 2,490,253 | Buchanan | Dec. 6, 1949 |
| 2,490,286 | Tornblom | Dec. 6, 1949 |
| 2,491,157 | Bottoni | Dec. 13, 1949 |

FOREIGN PATENTS

| Number | Country | Date |
| --- | --- | --- |
| 273,295 | Great Britain | June 21, 1927 |